(12) United States Patent
Shekey

(10) Patent No.: US 9,147,378 B2
(45) Date of Patent: Sep. 29, 2015

(54) COLOR SELECTION INTERFACE

(71) Applicant: Adobe Systems Incorporated, San Jose, CA (US)

(72) Inventor: Aaron Shekey, Minneapolis, MN (US)

(73) Assignee: Adobe Systems Incorporated, San Jose, CA (US)

( * ) Notice: Subject to any disclaimer, the term of this patent is extended or adjusted under 35 U.S.C. 154(b) by 197 days.

(21) Appl. No.: 13/854,285

(22) Filed: Apr. 1, 2013

(65) Prior Publication Data

US 2014/0292799 A1 Oct. 2, 2014

(51) Int. Cl.
| | |
|---|---|
| G09G 5/00 | (2006.01) |
| G09G 5/02 | (2006.01) |
| G06F 3/08 | (2006.01) |
| G06K 9/00 | (2006.01) |
| G06K 9/40 | (2006.01) |
| G06F 3/0481 | (2013.01) |
| H04N 5/202 | (2006.01) |
| H04N 5/57 | (2006.01) |
| H04N 9/64 | (2006.01) |
| G09G 5/06 | (2006.01) |
| H04N 1/60 | (2006.01) |

(52) U.S. Cl.
CPC .............. *G09G 5/06* (2013.01); *H04N 1/6058* (2013.01)

(58) Field of Classification Search
USPC ......... 345/426, 581, 589–591, 593–594, 204, 345/690; 358/518–520, 523–524; 348/354, 348/356, 557, 577, 582, 602–603, 612, 630, 348/686, 687, 708; 382/162, 167, 254, 274; 715/700, 719–722, 833
See application file for complete search history.

(56) References Cited

U.S. PATENT DOCUMENTS

| | | | | |
|---|---|---|---|---|
| 5,416,890 | A * | 5/1995 | Beretta | 345/590 |
| 5,903,255 | A | 5/1999 | Busch et al. | |
| 6,857,809 | B2 * | 2/2005 | Granata | 403/121 |
| 7,701,464 | B1 * | 4/2010 | Gilra | 345/594 |
| 7,973,971 | B1 * | 7/2011 | Borg | 358/2.1 |
| 8,013,869 | B2 | 9/2011 | Voliter et al. | |
| 8,089,492 | B2 | 1/2012 | Titmuss et al. | |
| 2004/0001072 | A1 | 1/2004 | Newman | |
| 2007/0229861 | A1 | 10/2007 | Forbush et al. | |
| 2008/0129750 | A1 * | 6/2008 | Voliter et al. | 345/593 |
| 2011/0058065 | A1 * | 3/2011 | Kiuchi et al. | 348/229.1 |
| 2012/0206475 | A1 * | 8/2012 | Bryant et al. | 345/589 |
| 2012/0210229 | A1 * | 8/2012 | Bryant et al. | 715/723 |

\* cited by examiner

*Primary Examiner* — Wesner Sajous
(74) *Attorney, Agent, or Firm* — Finch & Maloney PLLC

(57) ABSTRACT

Techniques are disclosed for facilitating the selection of a color using a computer-based user interface. In one embodiment, the user interface includes a hue-saturation-brightness (HSB) color field and a luminosity slider. The HSB color field can be a two-dimensional field of a selected hue, with varying degrees of saturation displayed in one dimension, and varying degrees of brightness displayed in the other dimension. The luminosity slider can be a control element that adjusts the luminosity of a color having a selected hue and saturation. In such an embodiment, the HSB color field and the luminosity slider can be operatively coupled, such that modifying the luminosity of a selected color using the luminosity slider causes the resulting modified color to be indicated in the HSB color field. This provides the user with a better sense of how a selected color relates to other similar colors, thereby facilitating color selection.

21 Claims, 5 Drawing Sheets
(4 of 5 Drawing Sheet(s) Filed in Color)

COLOR SELECTION INTERFACE

FIELD OF THE DISCLOSURE

This disclosure relates generally to color selection, and more specifically, to a computer-based user interface that allows a user to select a color while viewing an array of available colors.

BACKGROUND

Computerized display and publishing systems are capable of generating an increasingly large number of unique colors. As a result, color selection tools, sometimes referred to as "color pickers", have become more sophisticated. For example, a color picker configured for use with a rudimentary display capable of generating only sixteen colors can simply display an array containing the sixteen possible colors. However, a color picker configured for use with a modern display capable of generating sixteen million colors generally cannot display an array containing all sixteen million possible colors. Moreover, even if it were possible to display all sixteen million possible colors, or even if a subset of the available colors were displayed, the colors in such an array would tend to blend into one another and it would be difficult for the user to easily visualize, pick and/or adjust a discrete color. To address these challenges, textual and graphical color pickers have been developed. Textual color pickers allow a user to enter parameters that define a particular color, such as red, green and blue parameters that define a color according to the red-green-blue (RGB) color model. Graphical color pickers employ user interface elements such as sliders and/or color fields that establish numerical parameters based on a user's manipulation of the sliders and/or selection from the color field.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
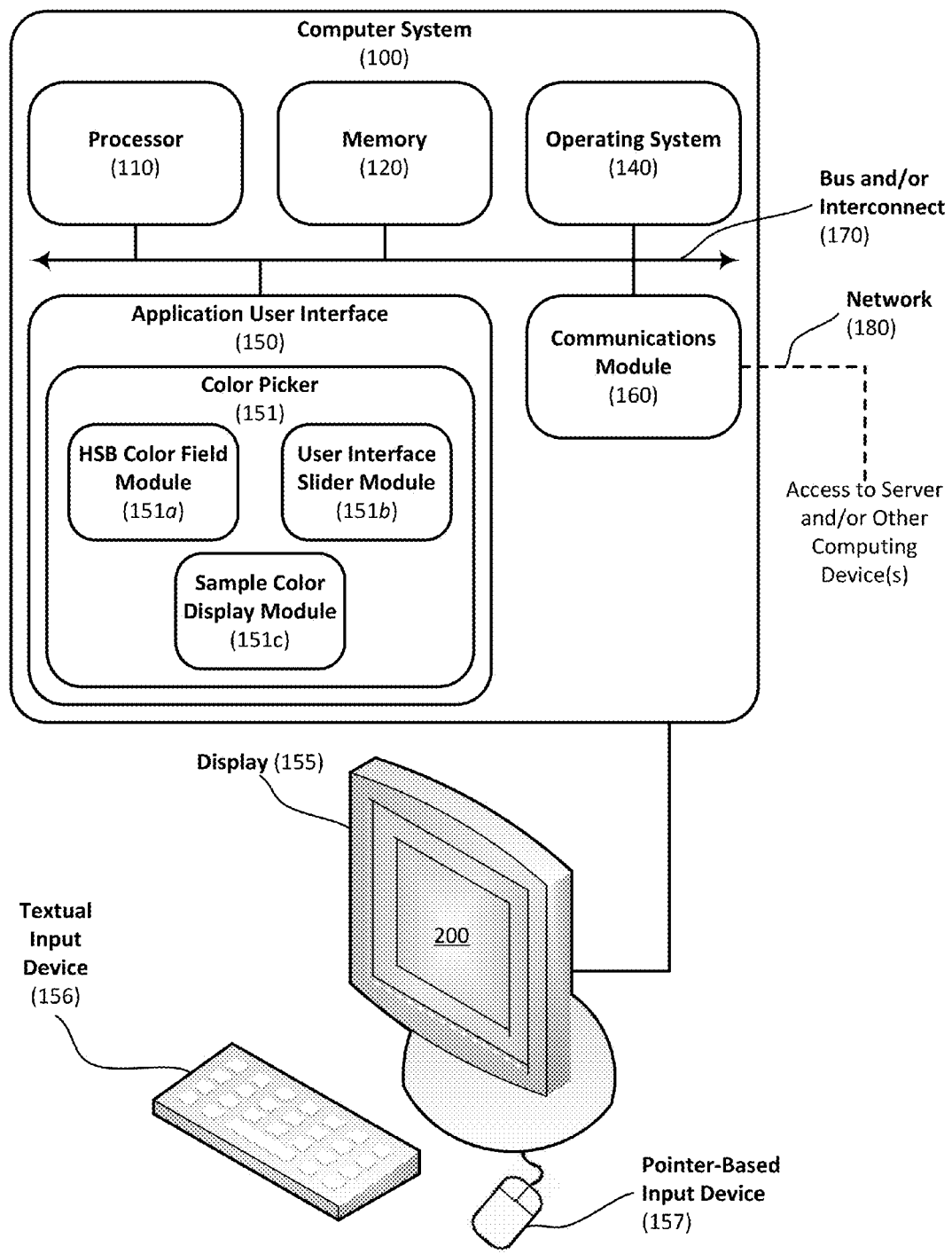
FIG. 1 is a block diagram schematically illustrating selected components of a computer system that can be used to implement certain embodiments of the present invention.

Techniques are disclosed for facilitating the selection of a color using a computer-based user interface. In one embodiment, the user interface includes a hue-saturation-brightness (HSB) color field and a luminosity slider. The HSB color field can be a two-dimensional field of a selected hue, with varying degrees of saturation displayed in one dimension, and varying degrees of brightness displayed in the other dimension. The luminosity slider can be a control element that adjusts the luminosity of a color having a selected hue and saturation. In such an embodiment, the HSB color field and the luminosity slider can be operatively coupled, such that modifying the luminosity of a selected color using the luminosity slider causes the resulting modified color to be indicated in the HSB color field. This allows the user to easily visualize several things, such as a relative luminosity of a color selected from the HSB color field, a spectrum of colors having the same hue and saturation but varying luminosity, and a relationship between that spectrum of colors and other colors in the HSB color field. Thus, coupling the HSB color field and the luminosity slider provides the user with a better sense of how a selected color relates to other similar colors, thereby facilitating color selection. Numerous configurations and variations of such techniques will be apparent in light of this disclosure.

As used herein, "color" is a characteristic of light that can be parametrically defined according to a variety of different models. For example, the aforementioned RGB color model can be used to define a color based on three values (r, g, b) that correspond to the relative contributions of red, green and blue light, respectively, that can be used to form the color. The RGB color model is useful for the sensing, representation and display of color in electronic systems, but the (r, g, b) values are often non-intuitive in terms of establishing meaningful relationships between colors. For example, a dark brown color can be represented by the (r, g, b) values (44, 29, 7), while a similar but lighter cream color can be represented by the (r, g, b) values (221, 207, 187). Thus, it is unclear that these two colors are darker and lighter shades of each other from their respective (r, g, b) parameters. Therefore, other color models which provide more meaningful relationships between colors are often used in the context of color selection. Examples of such color models include the HSB color model and the hue-saturation-luminosity (HSL) color model. These color models rely on parameters such as hue, brightness, saturation and luminosity. These parameters are defined below and are summarized in Table A.

As used herein, "hue" refers, in addition to its ordinary meaning, to that attribute of a color that allows the color to be considered red, yellow, green, blue or any intermediate or contiguous color. As indicated in Table A, hue is typically expressed in terms of degree ranging from 0° to 360°, where 0° corresponds to red, 120° corresponds to green and 270° corresponds to blue. In this sense, hue can be thought of as the radial location where a particular color sits on a color wheel.

As used herein, "brightness" refers, in addition to its ordinary meaning, to how much a color of a given hue differs from black and a pure color of that same hue. Thus brightness can be thought of as a measure of the "intensity" of a given color. As indicated in Table A, brightness is typically expressed in terms of a percentage, where a brightness of 0% corresponds to pure black, and a brightness of 100% corresponds to intense color of a given hue. A color of a given hue having a brightness of 50% will generally appear less intense, muted or dim as compared to a color of that same hue having a brightness of 100%.

As used herein, "saturation" refers, in addition to its ordinary meaning, to how much a color differs from a grey color of the same brightness. Thus saturation can be thought of as a measure of the "greyness" or "purity" of a given color. As indicated in Table A, saturation is also typically expressed in terms of a percentage, where a saturation of 0% corresponds to a shade of grey between black and white, depending on the brightness of the color, and a saturation of 100% corresponds to pure color of that same brightness. A color of a given hue having a saturation of 50% will generally appear "muddy" or greyed out as compared to a color of that same hue having a saturation of 100%.

As used herein, "luminosity" refers, in addition to its ordinary meaning, to a measure of where a color falls on a spectrum between black and white, and thus luminosity can be thought of as a measure of how close a given color is to black or white. As indicated in Table A, luminosity is also typically expressed in terms of a percentage, where a luminosity of 0% corresponds to black and a luminosity of 100% corresponds to white. A color of a given hue and saturation having a luminosity of 50% will appear as close as possible to the pure color of that hue and saturation, as compared to colors having a higher (faded) or lower (darkened) luminosity. Thus luminosity is a unique parameter as compared to brightness and saturation in that the midpoint of the luminosity scale corresponds to a pure hue. Luminosity is also sometimes referred to as "lightness".

TABLE A

| Color | Representative Values and Appearance | | | | |
|---|---|---|---|---|---|
| Parameter | minimum | ↔ | midrange | ↔ | maximum |
| hue | 0° red | 120° green | | 240° blue | 360° red |
| brightness | 0% black | | 50% dim | | 100% intense color |
| saturation | 0% grey | | 50% muddy | | 100% pure color |
| luminosity | 0% black | | 50% pure color | | 100% white |

Representative values for selected color parameters.

General Overview

Modern computerized display and publishing systems are capable of generating a vast array of unique colors. For example, a computer system that uses 24 binary digits ("bits") to represent the color of a picture element ("pixel") is capable of generating $2^{24}$=16,777,216 unique colors; as a point of reference, the human eye is generally considered to be capable of distinguishing no more than 10 million unique colors. While such modern display and publishing systems provide computer users with powerful tools that can be used to produce and edit visually engaging content, the wide range of available colors presents challenges with respect to color definition and selection. As a result, existing color pickers tend to suffer from a number of shortcomings. For instance, the aforementioned RGB color model uses numerical parameters which may not indicate any relationship between, for example, darker and lighter shades of what may appear to be the same color. Graphical color pickers which rely on a selection being made from an HSB color field are used in many applications and are therefore familiar to many users, but they still do not provide users with a clear luminosity spectrum of available colors beginning with black, running through a pure hue of a color, and ending with white. Existing graphical color pickers which rely on sliders to adjust parameters such as hue, brightness, saturation and/or luminosity generally do not provide the user with a context of how the selected color relates to other similar colors defined by a combination of slightly different parameters. Unlike the RGB and HSB color models, the HSL color model tends to more closely approximate how people often intuitively think about color. This tends to make it easier for users, especially novice users, to understand how to create and manipulate desired colors. However, while the HSL color model is generally easier to understand on a conceptual level, from an user interface standpoint it can be difficult to select a color using this model. For instance, as noted above, an HSL color picker that relies solely on sliders to parametrically define a selected color tends to be too literal to the color specification and does not offer the user context when selecting a color. Furthermore, because luminosity ranges from black (0%) to white (100%), as indicated in Table A, the user cannot easily see how changing the saturation and/or brightness of a color having a given luminosity will affect the color selection.

Thus, and in accordance with an embodiment of the present invention, techniques are provided herein that facilitate the selection of a color using a computer-based user interface. In such an embodiment, an HSB color field and a luminosity slider can be operatively coupled, such that modifying the luminosity of a selected color using the luminosity slider causes the resulting modified color to be indicated in the HSB color field. This allows the user to select colors based on the more intuitive HSL color model, while still being able to easily see how manipulating the luminosity slider causes the location of the selected color to move within the displayed HSB color field. That is, such an embodiment provides allows user to select a color based on the more intuitive concept of luminosity, while simultaneously or nearly simultaneously displaying the familiar HSB color field that provides the user with a context of how the selected color relates to other colors having different saturation and/or brightness.

The various embodiments disclosed herein can be implemented in various forms of hardware, software, firmware and/or special purpose processors. For example, in one embodiment a non-transient computer readable medium has instructions encoded thereon that, when executed by one or more processors, cause one or more of the color selection methodologies disclosed herein to be implemented. Such a computer readable medium can be provided in the form of a computer software application or applet that is tangibly embodied on a memory device, and that can be executed by a computer having any suitable architecture. In certain embodiments the computer software application is specifically designed for the manipulation of artwork such as digital images and graphics, although in other embodiments the functionalities disclosed herein can be incorporated into other software applications, such as video editing applications, desktop publishing applications, or other content generation and modification applications. The computer software application may include a number of different modules, sub-modules or other components of distinct functionality that can provide information to, or receive information from, other components. These modules can be used, for example, to communicate with input and output devices such as pointing devices, display screens, touchscreens and/or other user interface devices. For instance, certain embodiments include an application user interface that includes a color picker comprising an HSB color field module configured to display an HSB color field, a user interface slider module configured to display one or more sliders usable to adjust color parameters, and a sample color display module configured to display a swatch of selected color.

For example, FIG. 1 is a block diagram schematically illustrating selected components of a computer system 100 that can be used to implement certain embodiments of the present invention. The computer system 100 may comprise, for example, one or more devices selected form a desktop or laptop computer, a workstation, a tablet, a smartphone, a set-top box or any other such computing device. A combination of different devices may be used in certain embodiments. The computer system 100 of this example embodiment includes, among other things, a processor 110, a memory 120, an operating system 140, an application user interface 150 and a communications module 160. As can be further seen, a bus and/or interconnect 170 is also provided to allow for intra-device communications using, for example, the communications module 160. The computer system 100 is optionally coupled to a network 180 to allow for communications with other computing devices, such as a server. Other componentry and functionality not reflected in the schematic block diagram of FIG. 1 will be apparent in light of this disclosure, and it will be appreciated that the claimed invention is not intended to be limited to any particular hardware configuration.

The processor 110 can be any suitable processor, and may include one or more coprocessors or controllers, such as a graphics processor, to assist in control of the computer system 100. The memory 120 can be implanted using any suitable type of digital storage, such as one or more of a disk drive, a universal serial bus (USB) drive, flash memory and/or random access memory (RAM). The operating system 140 can be implemented with any suitable operating system, but in some example embodiments is implemented with Google Android, Linux, Microsoft Windows, or Apple OS X. As will be appreciated in light of this disclosure, the techniques provided herein can be implemented on any such platforms. The communications module 160 can be any suitable network chip or chip set which allows for wired and/or wireless connection to a network 180 so that the computer system 100 can communicate with other local and/or remote computing systems and/or servers. The network 180 may be a local area network (such as a home-base or office network), a wide area network (such as the Internet) or a combination of such networks, whether public, private or both. In some cases, access to computing resources on a given network may require credentials such as usernames, passwords and/or any other suitable security mechanisms. Other embodiments of computer system 100 may not be coupled to any network and may just operate as a stand-alone computing system.

The application user interface 150 is configured to provide information to, and to receive information and commands from, a user. It can be implemented with or otherwise used in conjunction with a variety of suitable input/output hardware devices that are coupled to or that otherwise form a part of the computer system 100. As illustrated in FIG. 1, examples of such input/output hardware devices include display 155, a textual input device such as keyboard 156 and a pointer-based input device such as mouse 157. Other input/output devices that may be used in other embodiments include a touchscreen, a touchpad, a speaker and/or a microphone. In certain embodiments the application user interface 150 is installed local to the computer system 100, as shown in the example embodiment of FIG. 1. Alternatively, the computer system 100 can be implemented in a client-server arrangement wherein at least some portions of the application user interface 150 are provided to the client computing system 100 using an applet, such as a JavaScript applet, or other downloadable module. Such a remotely accessible module can be provisioned in real-time in response to a request form the client computing system 100 for access to a given server having resources that are of interest to the user of the client computing system 100. For example, a user of a tablet computer may invoke the application user interface 150 upon accessing a cloud-based repository of images and/or other content that the user wishes to edit. In such embodiments the server can be local to the network 180 or remotely coupled to the network 180 by one or more other networks and/or communication channels. In any such stand-alone or networked computing scenarios, the application user interface 150 may be implemented with any suitable interface technologies that allow a user to interact with the computing system 100.

In certain embodiments the application user interface 150 includes a color picker 151 that is configured to provide the various color selection techniques disclosed herein, thereby facilitating the process of selecting a color for use with any of a variety of computer-based applications. Examples of such applications include image editing software applications, web content generation applications, desktop publishing applications, word processing applications, presentation applications, digital video processing applications and electronic mail applications. To this end, note that the application user interface 150 may be included in a given such application, or used in conjunction with such an application. Likewise, in other embodiments the color picker 151 itself may be integrated into the given application rather than the entire user interface 150 being so integrated. In still other embodiments, the color picker 151 may be implemented as a distinct executable application that works in conjunction with the user interface 150 and/or target application. The color picker 151 can also be used to make a color selection in conjunction with an operating system or a configuration settings manager associated with the computer system 100. More generally, it will be appreciated that modern computer systems and computer applications often allow users to select colors for a wide variety of purposes, not only for content generation but also for screen appearance customization, and that a color picker such as disclosed herein can be used for such purposes. As illustrated in FIG. 1, the functionality of color picker can be implemented using, for example, modules including an HSB color field module 151a, a user interface slider module 151b and a sample color display module 151c. Other modules may additionally or alternatively be included in other embodiments. For example, in other embodiments the color selection techniques may be implemented in one or more dedicated modules with which the application user interface 150 interacts. These various color selection techniques and modules will be discussed in turn.

As will be further appreciated in light of this disclosure, the various components and modules of the disclosed system, such as the color picker 151 and/or by the application user interface 150, can be implemented in software, such as a set of instructions encoded on a suitable computer readable medium, that when executed by one or more processors, cause the various methodologies provided herein to be carried out. The instructions can be encoded using a suitable programming language, such as C, C++, object-oriented C, JavaScript or BASIC, or alternatively, using custom or proprietary instruction sets. The computer readable medium may be a non-transitory storage medium suitable for storing digital information, such as a hard drive, a server, flash memory and/or random access memory. In alternative embodiments, the components and/or modules can be implemented with hardware, including gate level logic such as a field-programmable gate array (FGPA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the functionality described herein. It will be apparent that any suitable combination of hardware, software and firmware can be used.

User Interface

Figure 2A:
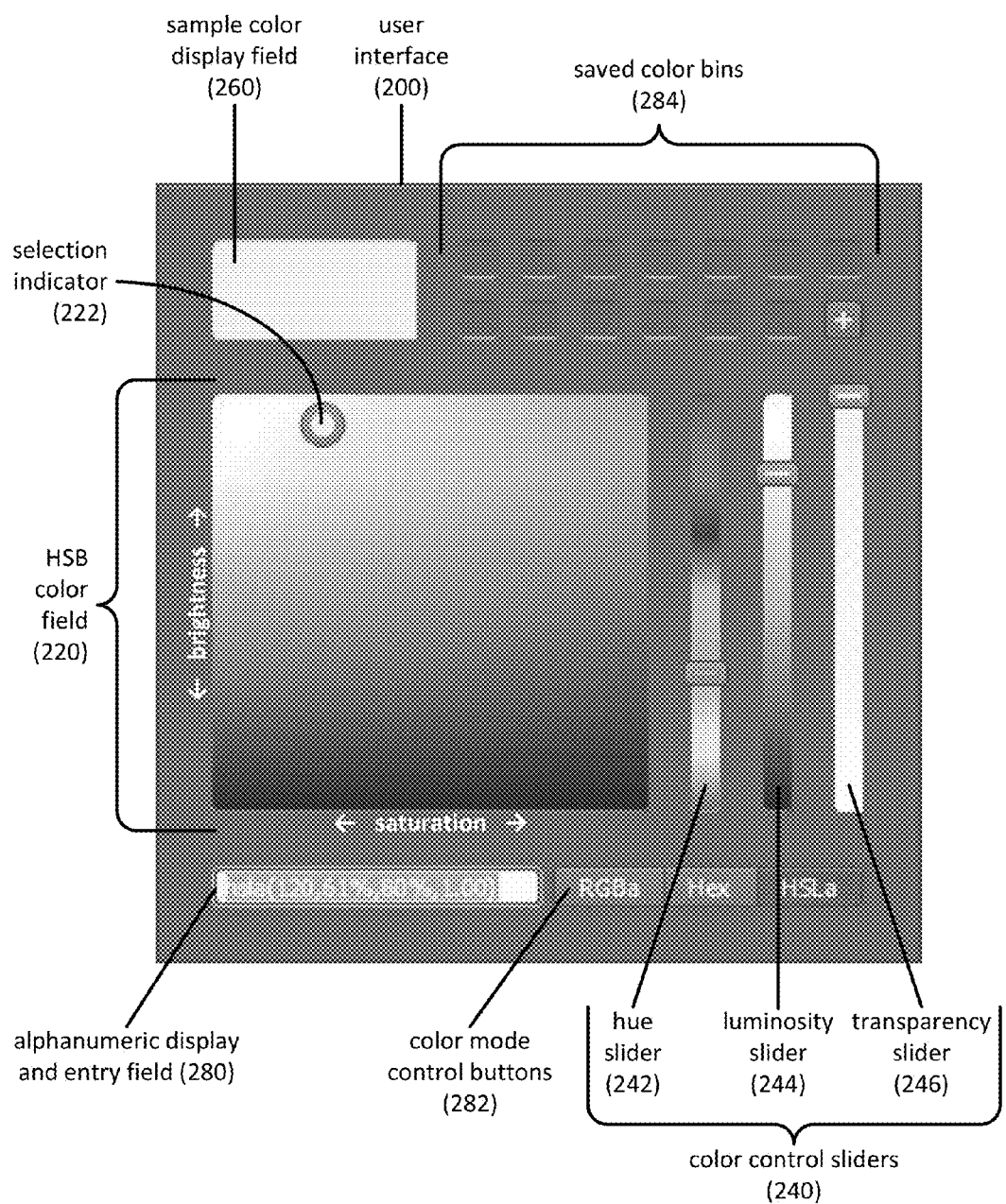
FIG. 2A illustrates an example user interface that can be used to make a color selection in accordance with an embodiment of the present invention, wherein a color having a relatively high luminosity has been selected.
Figure 2B:
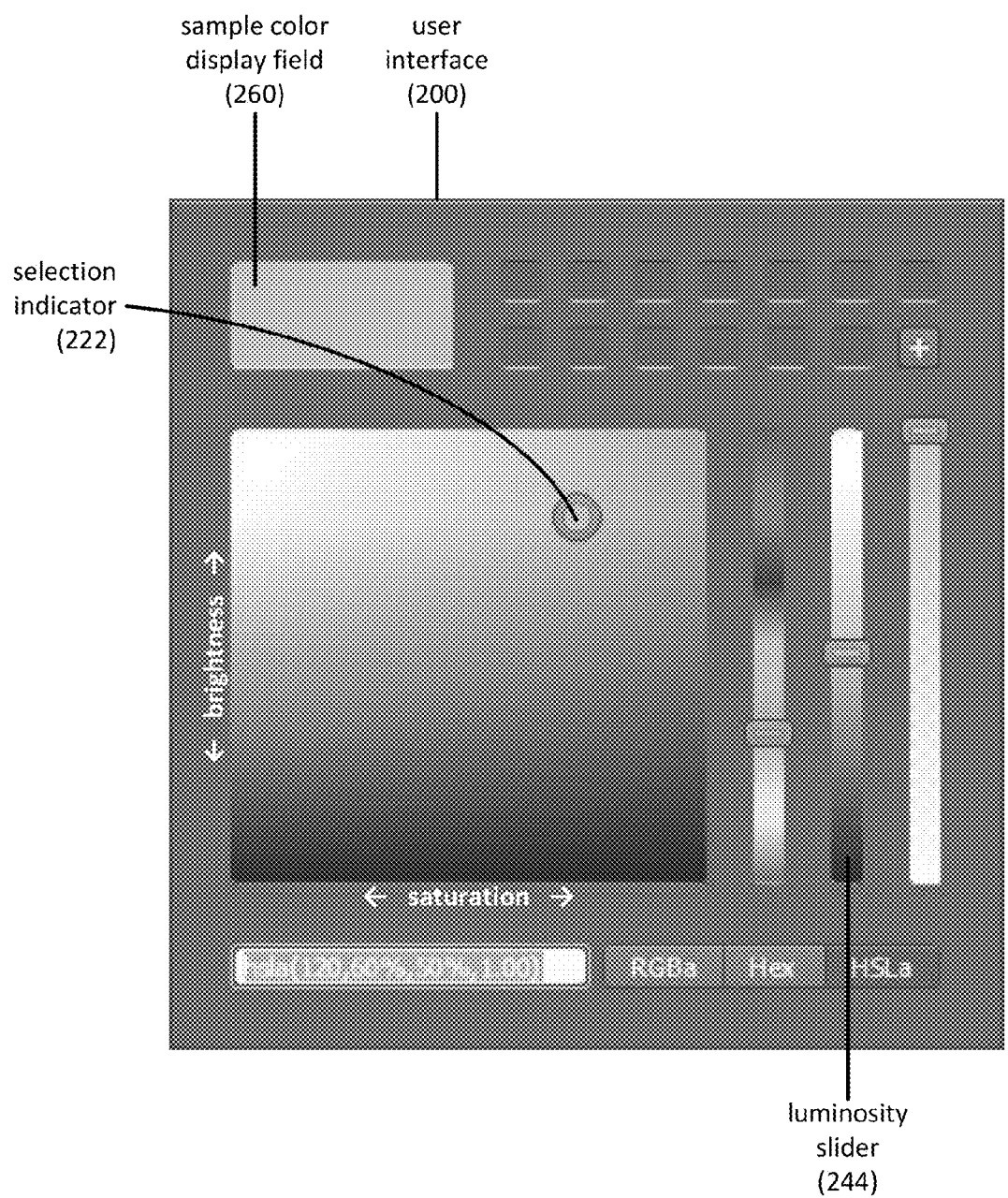
FIG. 2B illustrates an example user interface that can be used to make a color selection in accordance with an embodiment of the present invention, wherein a color having a moderate luminosity has been selected.
Figure 2C:
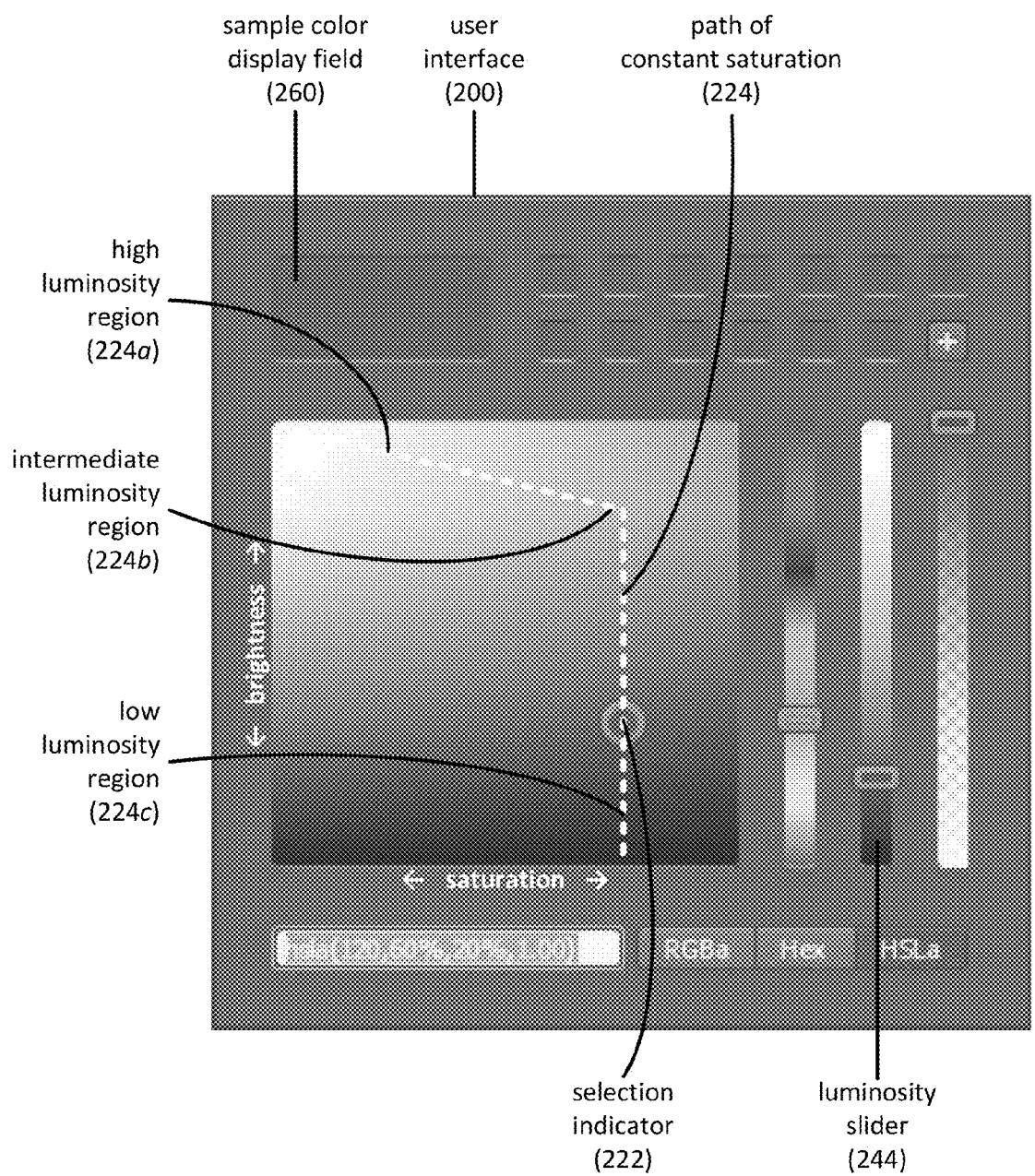
FIG. 2C illustrates an example user interface that can be used to make a color selection in accordance with an embodiment of the present invention, wherein a color having a relatively low luminosity has been selected.

FIGS. 2A through 2C illustrate an example user interface 200 that can be used to make a color selection in accordance with an embodiment of the present invention. As illustrated in FIG. 1, the application user interface 150 can be configured to cause the user interface 200 to appear on a display 155 that is coupled to, or that otherwise forms part of, computer system 100. The user interface 200 can be displayed in response to a user command associated with color selection, such as a command to select a text input color, a command to adjust the appearance of a digital image, or a command to select a background color to be used in an application and/or operating system user interface. The user interface 200 includes an HSB color field 220 generated by the HSB color field module 151a, one or more color control sliders 240 generated by the user interface slider module 151b, and a sample color display field 260 generated by the sample color display module 151c. Other user interface elements can be used in other embodiments, as will be discussed in turn. It will also be appreciated that the particular arrangement, orientation and appearance of the various user interface elements illustrated in FIG. 2A is provided for purposes of illustration only, and that the present invention is not intended to be limited to any such arrangement, orientation or appearance.

The HSB color field 220 displays color of a uniform hue having varying saturation and brightness, and can be generated by the HSB color field module 151a. In the example embodiment illustrated in FIG. 2A, the saturation varies along the horizontal axis, with color having a minimum saturation on the left side of the HSB color field 220, and color having a maximum saturation on the right side of the HSB color field 220. Thus a point on the left side of the HSB color field 220 has a grey appearance of a selected brightness, while a corresponding point on the right side of the HSB color field 220 has a pure color of that same brightness. Likewise, in such embodiments the brightness varies along the vertical axis, with color having a minimum saturation at the bottom side of the HSB color field 220, and a color having a maximum brightness at the top side of the HSB color field 220. Thus a point on the bottom side of the HSB color field 220 is black, while a corresponding point on the top side of the HSB color field 220 has an intense color of a given saturation. It should be noted that the arrangement of the colors along the horizontal and vertical axes are not necessarily linear with respect to saturation and brightness. Thus the 50% saturation point is not necessarily halfway between the left and right sides of the HSB color field 220, and the 50% brightness point is not necessarily halfway between the top and bottom sides of the HSB color field 220. The hue of the color displayed in the HSB color field 220 can be selected using a color control slider 240, as will be discussed in turn.

Still referring to the user interface 200 illustrated in FIG. 2A, the HSB color field optionally includes a selection indicator 222. The selection indicator 222 can be used to indicate a color selected from the HSB color field 220. Such a selection can be made using a pointer-based input device such as the mouse 157 illustrated in FIG. 1A, although any other suitable pointer-based input device, such as a touchscreen, a stylus, a track pad or arrow buttons on a keyboard, can be used in alternative embodiments. In certain embodiments, the selected color is indicated not only based on the position of selection indicator 222, but is also displayed in sample color display field 260. The sample color display field 260 advantageously provides a uniform field of the selected color, thereby allowing the user to view the selected color in a context that is isolated from other similar colors. The sample color display field 260 can optionally be configured to display the selected color adjacent to a previously selected or alternative color to further assist the user in comparing two different colors and making a color selection. In such embodiments the color appearing in the sample color display field 260 is generated by the sample color display module 151c. It will be appreciated that the selection indicator 222 need not have a circular shape, and that in alternative embodiments other types of selection indicator 222, such as a square, an "×" symbol, a "+" symbol, or an opaque dot, can be used.

As mentioned previously, the user interface 200 optionally includes one or more color control sliders 240. As used herein, a "slider" refers, in addition to its ordinary meaning, to a user interface element that displays a range of possible choices and that includes a movable selection element that can be positioned at a desired location within the range. For instance, in the example embodiment illustrated in FIG. 2A, the user interface 200 includes a hue slider 242, a luminosity slider 244 and a transparency slider 246, all of which are generated by the user interface slider module 151b. Each of these example sliders includes a range of possible hues, luminosities, or transparencies and a movable selection element that can be positioned corresponding to a desired hue, luminosity or transparency, respectively. In alternative embodiments, one or more of these sliders may be omitted, and/or other additional sliders may be included. The color control sliders 240 can be used to adjust the color displayed in the sample color display field 260. The color control sliders 240 can be manipulated using a pointer-based input device such as the mouse 157 illustrated in FIG. 1A, although any other suitable pointer-based input device, such as a touchscreen, a stylus, a track pad or arrow buttons on a keyboard, can be used in alternative embodiments.

For example, in one embodiment moving the hue slider 242 causes the hue of the color displayed in the HSB color field 220 and the sample color display field 260 to change. Thus the user could, for instance, change the green hue displayed in FIG. 2A to a blue hue by moving the hue slider 242 upwards by an appropriate amount. Likewise, the transparency slider 246 can be used to adjust the transparency of the selected color, which may be useful where the selected color is to be positioned over an underlying object that should be at least partially visible through the selected color. Because hue and transparency can be adjusted independently of saturation and brightness, moving the hue slider 242 and/or transparency slider 246 does not cause the location of selection indicator 222 within the HSB color field 220 to change.

The luminosity slider 244 can be used to adjust the luminosity of a selected color appearing in the sample color display field 260. The luminosity of a selected color can be adjusted independently of the color's saturation, such that saturation can remain constant while luminosity ranges from 0% to 100%. In contrast, the brightness of a selected color depends on luminosity, such that the brightness of the color will range from 0% to 100% as the luminosity also ranges from 0% to 100%. However, the correspondence between these two parameters may be nonlinear across the full range, such that, for example, a luminosity of 80% does not necessarily correspond to a brightness of 80%. Thus, because adjusting luminosity will result in a corresponding adjustment to brightness, the moving the luminosity slider 244 will cause the location of the selection indicator 222 in HSB color field 220 to move. In certain embodiments, such as illustrated in FIGS. 2A through 2C, the luminosity slider 244 is positioned adjacent to the HSB color field 220, such that colors in the luminosity slider 244 having high luminosity are positioned adjacent to colors in the HSB color field 220 having high brightness. Thus, in such embodiments moving the luminosity solider 224 in a given direction results in movement of the selection indictor 222 having at least a component in that given direction. Note, however, that this is not to mean that the position of slider 244 corresponds to the selection indicator 222 in a perfectly horizontal plane; nor does it mean that high luminosity colors in the band of the slider 244 are necessarily positioned in a perfectly horizontal plane to corresponding high brightness colors in the HSB color field 220. Rather, and as will be appreciated in light of this disclosure, the luminosity slider 244 intuitively allows a user to move the selection indicator 222 along a path that includes at least a portion of constant saturation but may also include a portion of non-constant saturation. In this way, the user can readily visualize how this range of luminosities relates to other colors in the HSB color field 220 having lower or higher saturation.

For example, FIG. 2A illustrates the appearance of user interface 200 during selection of a color having a luminosity of 80%. In contrast, FIG. 2B illustrates the appearance of user interface 200 after the luminosity has been reduced to 50%. A user can make such an adjustment by manipulating the luminosity slider 244 downward using, for example, mouse 157. As illustrated in FIG. 2B, such an adjustment causes the selection indicator 222 to also move to a new position in the HSB color field 220. The new position is further downward on the vertical axis based on the fact that a color with 50% luminosity has a lower brightness than a color having 80% luminosity. The new position of the selection indicator 222 in FIG. 2B is also closer to the right side of the horizontal axis, although it should be noted that this does not correspond to an increase in saturation. As set forth above, luminosity and saturation are independent color parameters, and thus any movement of the selection indicator 222 along the horizontal axis is caused by the fact that the arrangement of colors along the horizontal axis is not linear with respect to saturation. Thus the colors appearing in the sample color display field 260 in FIGS. 2A and 2B have the same saturation and hue, but different brightness and luminosity.

Likewise, FIG. 2C illustrates the appearance of user interface 200 after the color selection illustrated in FIG. 2B has been further modified to select a color having a luminosity of 20%. Such an adjustment can be made by further manipulating the luminosity slider 244 downward. Thus again causes the selection indicator 222 to move to a new position in the HSB color field 220 that is further downward on the vertical axis based on the fact that a color with 20% luminosity has a lower brightness than colors having 80% or 50% luminosity. A path of constant saturation 224 is also illustrated in FIG. 2C. The path of constant saturation 224 corresponds to the path the selection indicator 222 follows as the user manipulates luminosity slider 224 to adjust luminosity between a relatively high luminosity region 224a, an intermediate luminosity region 224b and a relatively low luminosity region 224c. As illustrated in FIG. 2C, the path of constant saturation 244 has a first linear portion corresponding to colors having a luminosity ranging from 0% to 50%, and a second linear portion corresponding to colors having a luminosity ranging from 50% to 100%. In certain embodiments the path of constant saturation 224 is not displayed in the HSB color field 220, while in other embodiments the path of constant saturation 224 is always displayed or is selectively displayed based on a user-configurable setting. It will be appreciated that a virtually infinite number of paths of constant saturation could be drawn in the HSB color field 220, and that shifting the path of constant saturation 224 illustrated in FIG. 2C downwards and to the left will correspond to a range of luminosities having a lower saturation, while showing the path upwards and to the right will correspond to a range of luminosities having a higher saturation.

Thus, FIGS. 2A through 2C illustrate an example embodiment of a color picker user interface 200 in which the HSB color field 220 and the luminosity slider 244 are operatively coupled. In such embodiments, manipulating the luminosity slider 244 causes the selection indicator 222 to move along a path of constant saturation 224 within the HSB color field 220. Likewise, moving the selection indicator 222 within the HSB color field 220 causes the luminosity slider 244 to indicate the luminosity of the newly selected color. The luminosity slider 244 displays a full array of luminosities ranging from black (0%) to white (100%), thereby allowing the user to easily appreciate the relative luminosity of a color selected directly from the HSB color field 220. Moreover, by using the luminosity slider 244 to move the selection indicator 222 along a path of constant saturation 224, the user can readily visualize how this range of luminosities relates to other colors in the HSB color field 220 having slightly lower or higher saturation. Using the luminosity slider 244 to select a color having 50% luminosity also provides the user with an easy way to quickly select the purest version of a color for a given saturation. On the other hand, presenting only an HSB color field with no means for independently adjusting luminosity makes it difficult for users to select a color based on the more intuitive HSL color model. And providing a luminosity slider without an HSB color field makes it difficult or impossible for a user to understand how a selected color relates to other colors having similar saturation and/or brightness. Thus, presenting an operatively coupled HSB color field and luminosity slider provides a user with a better sense of context when making a color selection.

In certain embodiments the user interface also optionally includes other features, such as an alphanumeric display and entry field 280, one or more color mode control buttons 282, and a plurality of saved color bins 284. The alphanumeric display and entry field 280 can be used to display and/or enter parameters that define a selected color. Thus, in certain embodiments moving the selection indicator 222 and/or certain of the color control sliders 240 cause the parameters appearing in the alphanumeric display and entry field 280 to change. Displaying such parameters advantageously allows the user to quantify a particular color selection, adjust a particular color parameter by a specific amount, and optionally copy the parametric definition for use elsewhere. Color mode control buttons 282 can be used to select the particular color model used to define the selected color. For example, the example embodiment illustrated in FIG. 2A includes color mode control buttons 282 than can be used to define the selected model according to the RGB color model, according to a hexadecimal code, and according to the HSL color model. In embodiments that include a transparency slider 246, the color model can further include a transparency parameter a that ranges from zero (completely transparent) to one (completely opaque). The user interface also optionally includes one or more saved color bins 284 that can be used to save previously defined colors for future use.

Methodology

Figure 3:
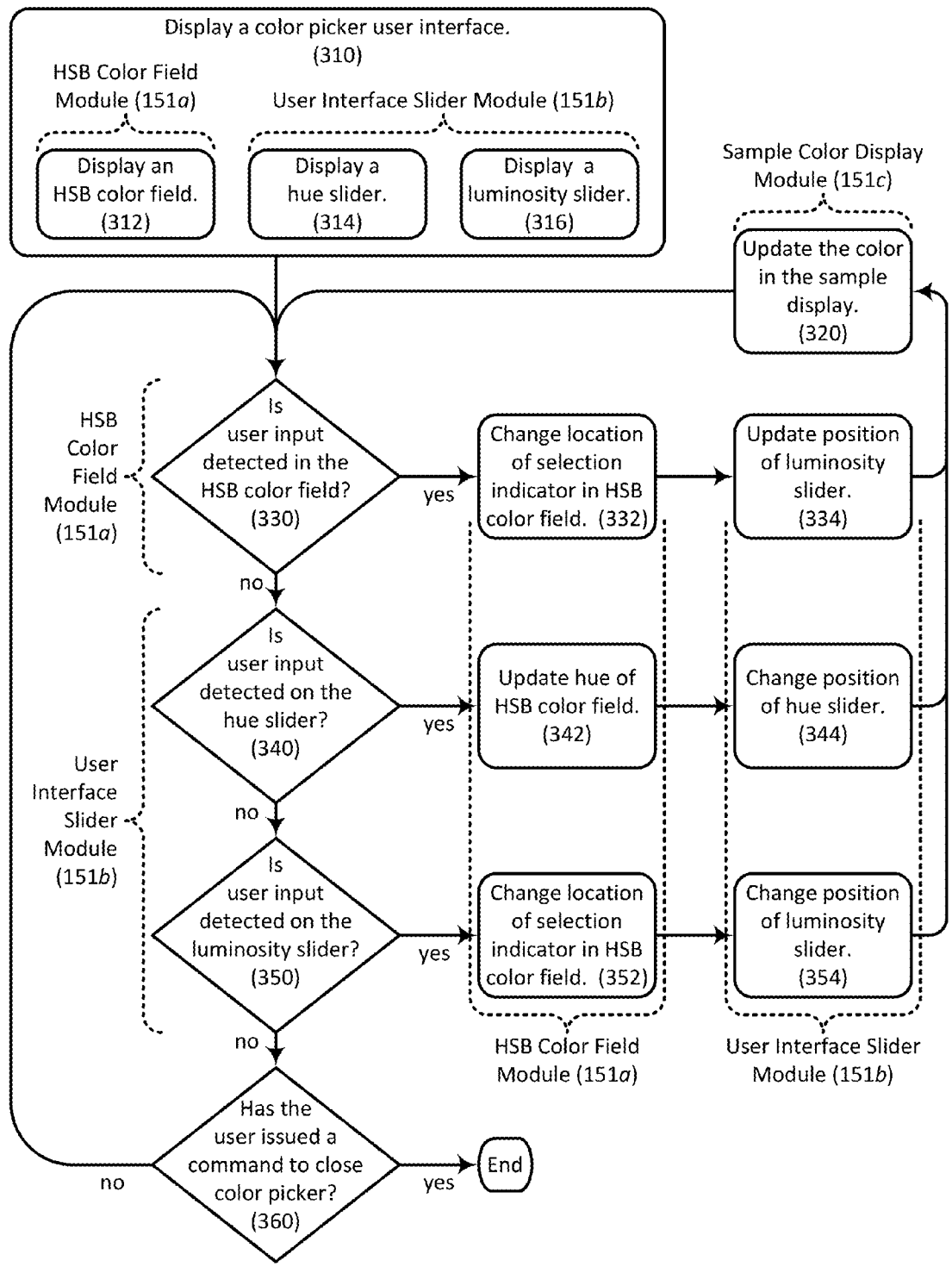
FIG. 3 is a flowchart illustrating an example technique for using the user interface of FIGS. 2A-2C for making a color selection in accordance with an embodiment of the present invention.

FIG. 3 illustrates an example technique for using the system architecture of FIG. 1 and the user interface of FIGS. 2A-2C for making a color selection in accordance with an embodiment of the present invention. As can be seen, this example methodology includes a number of phases and sub-processes, the sequence of which may vary from one embodiment to the next. However, when considered in the aggregate, these phases and sub-processes form a complete color selection function that is responsive to user commands in accordance with certain of the embodiments disclosed herein. This methodology can be implemented, for example, using the system architecture illustrated in FIG. 1 and the user interface illustrated in FIGS. 2A through 2C, as described above. However, other system architectures and user interfaces can be used in other embodiments, as will be apparent in light of this disclosure. To this end, the correlation of the various functions shown in FIG. 3 to specific components and user interface elements shown in FIGS. 1 and 2A through 2C is not intended to imply any structural and/or use limitations. Rather, other embodiments may include, for example, varying degrees of integration wherein multiple functionalities are effectively performed by one system, such as where a single module is used to generate and control an HSB color field, a luminosity slider and a sample color display field. Thus, other embodiments may have fewer or more modules and/or user interface elements depending on the granularity of implementation. Numerous variations and alternative configurations will be apparent in light of this disclosure.

The color selection methodology illustrated in FIG. 3 commences with displaying 310 a color picker user interface 200. This can be done in response to a user command that is associated with a color selection, such as a command to select the color of text in a spreadsheet, to modify a digital photograph, or to configure the appearance of an operating system user interface. In certain embodiments, displaying the color picker user interface 200 further comprises invoking an HSB color field module 151a to display 312 an HSB color field 220, and invoking a user interface slider module 151b to display 314 a hue slider 242 and to display 316 a luminosity slider 244. As described above, in other embodiments additional or alternative user interface elements can be displayed, such as a transparency slider, an alphanumeric display and entry field, one or more color mode control buttons and/or one or more saved color bins. Once the color picker user interface 200 is displayed, the method can be configured to respond to a particular type of user input. Or, if the user issues a command to close 360 the color picker 151, the method terminates.

For example, if the HSB color field module 151a detects 330 user input in the HSB color field 220, the location of the selection indicator 222 in the HSB color field 220 can be changed 332 by the HSB color field module 151a. In such case, the user interface slider module 151b can be configured to update 334 the position of luminosity slider 244 based on the color selected from the HSB color field 220. The sample color display module 151c can also be configured to update 320 the color displayed in the sample color display field 260 based on the user input. It will be appreciated that the particular sequence of updating the respective positions of the selection indicator 222 and the luminosity slider 244, as well as updating the sample color display field 260, is interchangeable, and that the present invention is not intended to be limited to any such sequence.

On the other hand, if the user interface slider module 151b detects 340 user input on the hue slider 242, the hue of the color appearing in the HSB color field 220 can be changed 342 by the HSB color field module 151a. In such case, the user interface slider module 151b can be configured to change 334 the position of hue slider 242 based on the user's input. The sample color display module 151c can also be configured to update 320 the color displayed in the sample color display field 260 based on the newly selected hue. It will be appreciated that the particular sequence of updating the respective colors of the HSB color field 220 and the sample color display field 260, as well as updating the position of the hue slider 242, is interchangeable, and that the present invention is not intended to be limited to any such sequence.

Alternatively, if the user interface slider module 151b detects 350 user input on the luminosity slider 350, the location of the selection indicator 222 in the HSB color field 220 can be changed 352 by the HSB color field module 151a. In such case, the user interface slider module 151b can be configured to update 354 the position of luminosity slider 244 based on the user's input. The sample color display module 151c can also be configured to update 320 the color displayed in the sample color display field 260 based on the newly selected luminosity. It will be appreciated that the particular sequence of updating the respective positions of the selection indicator 222 and the luminosity solider 244, as well as updating the sample color display field 260, is interchangeable, and that the present invention is not intended to be limited to any such sequence.

CONCLUSION

Numerous variations and configurations will be apparent in light of this disclosure. For instance, one example embodiment provides a color selection method that comprises displaying an HSB color field having colors of varying saturation arranged along a first axis and colors of varying brightness arranged along a second axis. The HSB color field includes a selection indicator. The method further comprises displaying a band of colors having varying luminosity and including a user interface slider element displayed thereon. The method further comprises moving the selection indicator within the HSB color field based on a detected movement of the user interface slider element. An updated location of the selection indicator that corresponds to a detected location of the user interface slider element defines a selected color. In some cases the HSB color field displays colors having a common hue. In some cases (a) the band of colors having varying luminosity is arranged parallel to the second axis of the HSB color field; and (b) colors in the band having high luminosity are positioned adjacent to colors in the HSB color field having high brightness. In some cases the method further comprises displaying a sample color field having the selected color. In some cases the selection indicator comprises a hollow ring shape with an interior region having the selected color. In some cases the colors of varying saturation are arranged along the first axis non-linearly. In some cases the method further comprises displaying an alphanumeric display and entry field that indicates a hue parameter, a saturation parameter and a luminosity parameter corresponding to the selected color. In some cases the method further comprises displaying a path of constant saturation in the HSB color field, the path of constant saturation extending over colors corresponding to the band of colors having varying luminosity. In some cases the method further comprises displaying a path of constant saturation in the HSB color field, the path of constant saturation including a first linear potion corresponding to colors having a luminosity ranging from 0% to an intermediate point, and a second linear portion corresponding to colors having a luminosity ranging from the intermediate point to 100%. In some cases the method further comprises displaying a path of constant saturation in the HSB color field, the path of constant saturation including a first linear potion corresponding to colors having a luminosity ranging from 0% to an intermediate point, and a second linear portion corresponding to colors having a luminosity ranging from the intermediate point to 100%, wherein the first and second linear portions are not collinear. In some cases the band of colors having varying luminosity includes colors having a luminosity ranging from 0% to 100%.

Another example embodiment of the present invention provides a color selection system that comprises a user interface slider module configured to display a luminosity slider. The luminosity slider includes a band of colors having varying luminosity and a movable selection element. The system further comprises an HSB color field module configured to display a movable selection indicator that is at least partially positioned within an HSB color field. A position of the movable selection indicator is responsive to movement of the selection element along the band of colors in the luminosity slider. In some cases the band of colors having varying luminosity is positioned substantially parallel to an axis of the HSB color field that corresponds to varying brightness, such that movement of the selection element in a first direction results in movement of the selection indicator having at least a component in the first direction. In some cases a position of the movable selection element is responsive to movement of the selection indicator. In some cases the HSB color field module is further configured to display a path of constant saturation in the HSB color field, wherein the path of constant saturation corresponds to the band of colors having varying luminosity. In some cases the user interface slider module is further configured to display a hue slider that includes a band of colors of varying hue and a transparency slider that includes a band of varying transparencies. In some cases the system further comprises a sample color display module configured to display a color associated with the position of the movable selection indicator.

Another example embodiment of the present invention provides a non-transient computer readable medium having instructions encoded thereon that, when executed by one or more processors, causes a color selection process to be carried out. The process comprises displaying an HSB color field having colors of varying saturation arranged along a first axis, and colors of varying brightness arranged along a second axis. The HSB color field includes a selection indicator. The process further comprises displaying a band of colors having varying luminosity and including a user interface luminosity slider element displayed thereon. The process further comprises moving the selection indicator within the HSB color field based on a detected movement of the luminosity slider element. An updated location of the selection indicator that corresponds to a detected location of the luminosity slider element defines a selected color. In some cases the process further comprises displaying a path of constant saturation in the HSB color field, the path of constant saturation extending over colors corresponding to the band of colors having varying luminosity. In some cases the process further comprises displaying a sample color field having the selected color. In some cases, the band of colors having varying luminosity includes colors having a luminosity ranging from 0% to 100%.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A color selection method comprising:
    displaying, on a display device, a hue-saturation-brightness (HSB) color field having colors of varying saturation arranged along a first axis and colors of varying brightness arranged along a second axis, wherein the HSB color field includes a selection indicator;
    displaying, on the display device, a band of colors having varying luminosity and including a user interface slider element displayed thereon; and
    moving the selection indicator within the HSB color field based on a detected movement of the user interface slider element, wherein an updated location of the selection indicator that corresponds to a detected location of the user interface slider element defines a selected color.

2. The color selection method of claim 1, wherein the HSB color field displays colors having a common hue.

3. The color selection method of claim 1, wherein:
    the band of colors having varying luminosity is arranged parallel to the second axis of the HSB color field; and
    colors in the band having high luminosity are positioned adjacent to colors in the HSB color field having high brightness.

4. The color selection method of claim 1, further comprising displaying, on the display device, a sample color field having the selected color.

5. The color selection method of claim 1, wherein the selection indicator comprises a hollow ring shape with an interior region having the selected color.

6. The color selection method of claim 1, wherein the colors of varying saturation are arranged along the first axis non-linearly.

7. The color selection method of claim 1, further comprising displaying, on the display device, an alphanumeric display and entry field that indicates a hue parameter, a saturation parameter and a luminosity parameter corresponding to the selected color.

8. The color selection method of claim 1, further comprising displaying, on the display device, a path of constant saturation in the HSB color field, the path of constant saturation extending over colors corresponding to the band of colors having varying luminosity.

9. The color selection method of claim 1, further comprising displaying, on the display device, a path of constant saturation in the HSB color field, the path of constant saturation including a first linear portion corresponding to colors having a luminosity ranging from 0% to an intermediate point, and a second linear portion corresponding to colors having a luminosity ranging from the intermediate point to 100%.

10. The color selection method of claim 1, further comprising displaying, on the display device, a path of constant saturation in the HSB color field, the path of constant saturation including a first linear portion corresponding to colors having a luminosity ranging from 0% to an intermediate point, and a second linear portion corresponding to colors having a luminosity ranging from the intermediate point to 100%, wherein the first and second linear portions are not collinear.

11. The color selection method of claim 1, wherein the band of colors having varying luminosity includes colors having a luminosity ranging from 0% to 100%.

12. A color selection system comprising:
    a memory;
    a processor operatively coupled to the memory and configured to execute instructions stored in the memory;
    a user interface slider module stored in the memory and configured to display a luminosity slider, the luminosity slider including a band of colors having varying luminosity and a movable selection element; and
    a hue-saturation-brightness (HSB) color field module stored in the memory and configured to display a movable selection indicator that is at least partially positioned within an HSB color field, wherein a position of the movable selection indicator is responsive to movement of the selection element along the band of colors in the luminosity slider.

13. The color selection system of claim 12, wherein the band of colors having varying luminosity is positioned substantially parallel to an axis of the HSB color field that corresponds to varying brightness, such that movement of the selection element in a first direction results in movement of the selection indicator having at least a component in the first direction.

14. The color selection system of claim 12, wherein a position of the movable selection element is responsive to movement of the selection indicator.

15. The color selection system of claim 12, wherein the HSB color field module is further configured to display a path of constant saturation in the HSB color field, wherein the path of constant saturation corresponds to the band of colors having varying luminosity.

16. The color selection system of claim 12, wherein the user interface slider module is further configured to display a hue slider that includes a band of colors of varying hue and a transparency slider that includes a band of varying transparencies.

17. The color selection system of claim 12, further comprising a sample color display module stored in the memory and configured to display a color associated with the position of the movable selection indicator.

18. A non-transitory computer readable medium having instructions encoded thereon that, when executed by one or more processors, causes a color selection process to be carried out, the process comprising:
 displaying a hue-saturation-brightness (HSB) color field having colors of varying saturation arranged along a first axis, and colors of varying brightness arranged along a second axis, wherein the HSB color field includes a selection indicator;
 displaying a band of colors having varying luminosity and including a user interface luminosity slider element displayed thereon; and
 moving the selection indicator within the HSB color field based on a detected movement of the luminosity slider element, wherein an updated location of the selection indicator that corresponds to a detected location of the luminosity slider element defines a selected color.

19. The non-transitory computer readable medium of claim 18, wherein the process further comprises displaying a path of constant saturation in the HSB color field, the path of constant saturation extending over colors corresponding to the band of colors having varying luminosity.

20. The non-transitory computer readable medium of claim 18, wherein the process further comprises displaying a sample color field having the selected color.

21. The non-transitory computer readable medium of claim 18, wherein the band of colors having varying luminosity includes colors having a luminosity ranging from 0% to 100%.

* * * * *